United States Patent [19]
Yasue et al.

[11] Patent Number: 4,620,316
[45] Date of Patent: Oct. 28, 1986

[54] SPEECH RECOGNITION SYSTEM

[75] Inventors: Toshikazu Yasue, Akishima; Michihiro Mese, Tokyo; Takeyuki Endo, Kodaira, all of Japan

[73] Assignee: Hitachi, Ltd., Tokyo, Japan

[21] Appl. No.: 799,482

[22] Filed: Nov. 19, 1985

Related U.S. Application Data

[63] Continuation of Ser. No. 384,601, Jun. 3, 1982, abandoned.

[30] Foreign Application Priority Data

Jun. 5, 1981 [JP] Japan .................................. 56-85717

[51] Int. Cl.⁴ .............................................. G10L 5/00
[52] U.S. Cl. ...................................................... 381/43
[58] Field of Search ..................................... 381/41–50

[56] References Cited

U.S. PATENT DOCUMENTS

| | | | |
|---|---|---|---|
| 3,312,950 | 5/1964 | Hillman et al. | 364/900 |
| 4,282,403 | 8/1981 | Sakoe | 381/43 |
| 4,286,115 | 8/1981 | Sakoe | 381/43 |
| 4,394,538 | 7/1983 | Warren et al. | 381/43 |
| 4,412,098 | 10/1983 | An | 381/43 |
| 4,432,096 | 2/1984 | Bunge | 381/43 |

Primary Examiner—E. S. Matt Kemeny
Attorney, Agent, or Firm—Antonelli, Terry & Wands

[57] ABSTRACT

A speech recognition system comprising a speech input device an analyzer for analyzing input speech to produce analyzed parameters and a discriminator for recognizing the input speech based on lthe analyzed parameters, has store/matching circuit at an input or output port of the analyzer for adjusting write time and read time. The store-matching circuit acts as a buffer with independent read and write addressing.

11 Claims, 13 Drawing Figures

SPEECH RECOGNITION SYSTEM

This is a continuation of application Ser. No. 384,601, filed June 3, 1982, now abandoned.

BACKGROUND OF THE INVENTION

1. Field of the Invention

The present invention relates to a speech recognition system which automatically recognizes input speech, and more particularly to a speech recognition system which recognizes a continuous input speech signal in real time.

2. Description of the Prior Art

In a usual and practical speech recognition system, an input speech signal is analyzed and compared with pre-registered standard patterns and the input signal is discriminated based on a detected degree of match. When words are used as the standard patterns, a word recognition system is provided, and the words which can be recognized can be changed by exchanging the standard patterns. When phonemes having a higher degree of freedom are used as the standard patterns, a phoneme recognition system is provided which provides a series of phonemes constituting speech.

In such a system, however, when the number of items to be recognized is large, much time is required in matching with the standard patterns. In order to overcome the above problem, matching circuits may be added to carry out parallel processing to reduce the matching time. However, it leads to an increase in the circuit scale because no time delay is permitted so long as the real time speech signal is handled. Another system for overcoming the above problem is a hierarchy recognition system as disclosed in Japanese Utility Model Application Nos. 54-91283 and 54-121819. For example, in the phoneme recognition system, there are approximately 110 syllables which constitute the phonemes of Japanese, such as [a], [i], . . . [n], . . . [gyo], . . . . They consist of combinations of consonants and vowels or only vowels. Seven vowels [a], [i], [u̇], [e], [o], a syllabic nasal [n] and a pause are included. In a first layer processing, the vowels which can be relatively stably recognized are recognized. In a second layer processing, the consonants between the vowels are recognized. Approximately seventeen consonants [p, t, k], [b, d, g], [s], [z], [h], [w, r, j], [m, n], an assimilated sound, a contracted sound and on consonant are included. Since they are located between the vowels, they can be recognized fast and stably. However, a problem encountered here is that the speech data must be retroactively processed in the second layer processing. Because the real time input speech signal is a time serial signal, the signal to be processed in the second layer processing is no longer present. If a general purpose computer is used, a batch processing in which the signals are temporarily stored in an internal memory or a magnetic tape and are subsequently read out section by section for processing can be used, but it is not possible to attain a real time speech recognition system which can process sequential input speech signals in real time.

In one prior art speech recognition system, a speech signal generated from a microphone or a tape recorder is converted by an analyzer to analysis parameters, frame by frame, and an input pattern is compared with standard patterns in a discriminator and one of the standard patterns which has the highest degree of match is selected as a discrimination output. However, when the number of standard patterns is large or the hierachy matching system is used, a frame of data may arrive before the compare operation for the data of the previous frame has been completed.

SUMMARY OF THE INVENTION

It is an object of the present invention to provide a novel real time speech recognition system which can accommodate an increased number of standard patterns and provide a hierarachy recognition.

In order to achieve the above object, in accordance with the present invention, a store/matching circuit having functions to regularly store input speech data sampled in real time or periodically, to read out the stored speech data without losing the regularity in response to a request from a discriminator and to shift a readout position of the speech data back and forth as required, is additionally provided so that the synchronous input and the asynchronous output are matched without losing the time sequence of the speech signal to realize an apparent real time processing and to allow the reverting to past data by utilizing the storage function to attain the compare operation. Because of the storage function, the speech data can be processed after it has been temporarily stored.

For example, in a two-layer or vowel-consonant hierarchy processing, the real time input speech data is compared with the vowels in a first layer processing to determine the presence or absence of the vowel and the type thereof. If the vowel is detected, the first layer processing is terminated and a second layer processing to recognize a consonant between the currently detected vowel and the previously detected vowel is carried out. The speech signal is received during this period and it is stored in the store circuit. When the consonant has been recognized, the vowel is again searched from the previous point. Because the number of vowels is five to seven at most, the recognition process is fast and catches up to the input speech signal. The speech signal which has been stored for a predetermined time period is automatically thrown away so that a constant amount of retroactive data can be accessed.

DESCRIPTION OF THE PREFERRED EMBODIMENTS

Figure 1A:
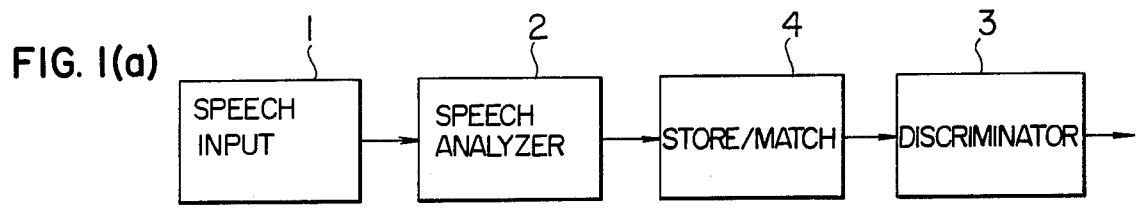
FIGS. 1(a), 1(b), 2 and 3 show block diagrams of basic configurations of a speech recognition system of the present invention.
Figure 1B:
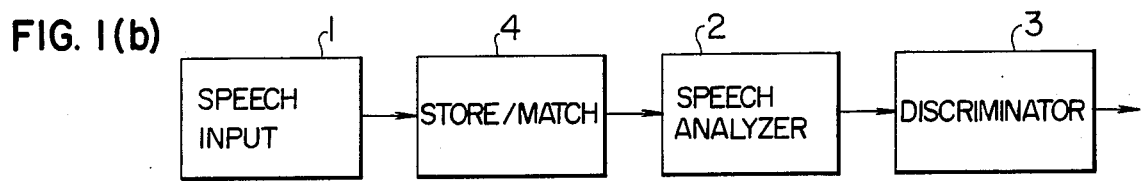
Figure 2:
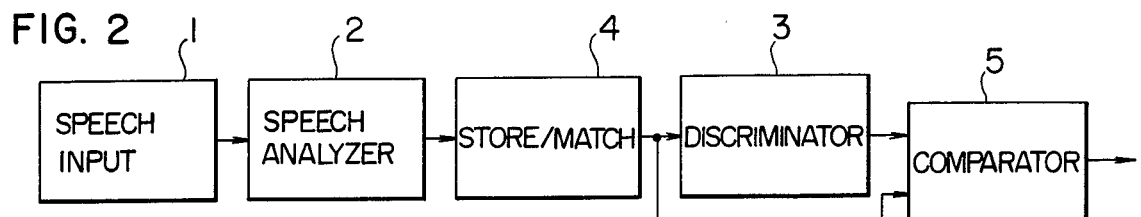
Figure 3:
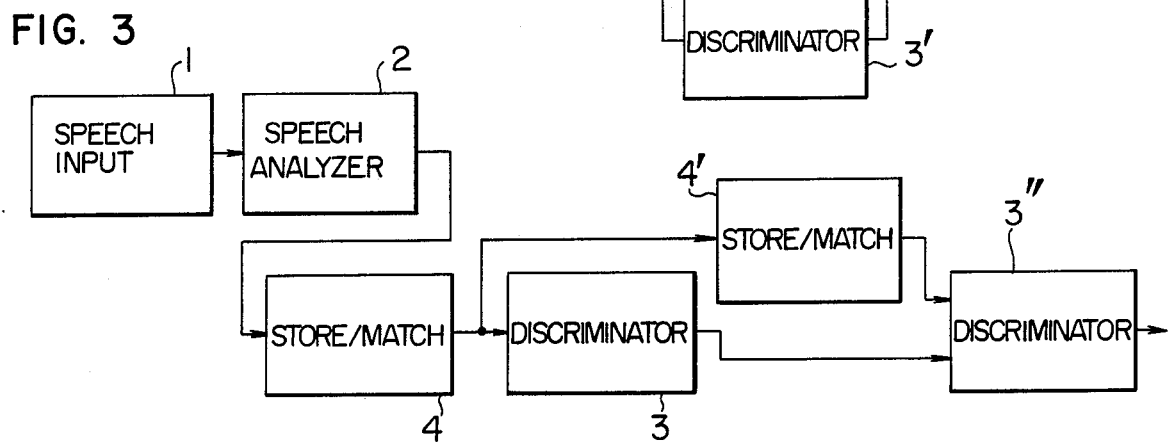

FIGS. 1–3 show block diagrams of basic configurations of the speech recognition system of the present invention.

In FIGS. 1(a) and 1(b), speech data periodically supplied from a speech input device 1 such as a microphone or data from a speech analyzer 2 which analyzes the speech data is temporarily stored in a store/matching circuit 4, which reads out the data in response to a request from a discriminator 3. FIG. 2 shows a configuration for a large number of standard patterns, in which an additional discriminator 3' is provided so that the data is parallelly processed by the two discriminators 3 and 3' and a most appropriate standard pattern discriminated by the discriminator 3 and a most appropriate standard pattern discriminated by the discriminator 3' are compared in a comparator 5 to determine the optimum matching standard pattern, which is to be produced as a recognition output. FIG. 3 shows a configuration for a two-step hierarchy system with two channels of circuit. A first step of processing is carried out by a store/matching circuit 4 and a discriminator 3 and a second step of processing is carried out by a store/matching circuit 4' and a discriminator 3''. The same advantage is attained when a plurality of discriminators and/or store/matching circuits are used like in FIGS. 2 and 4 and the present invention includes those configurations.

Figure 4:
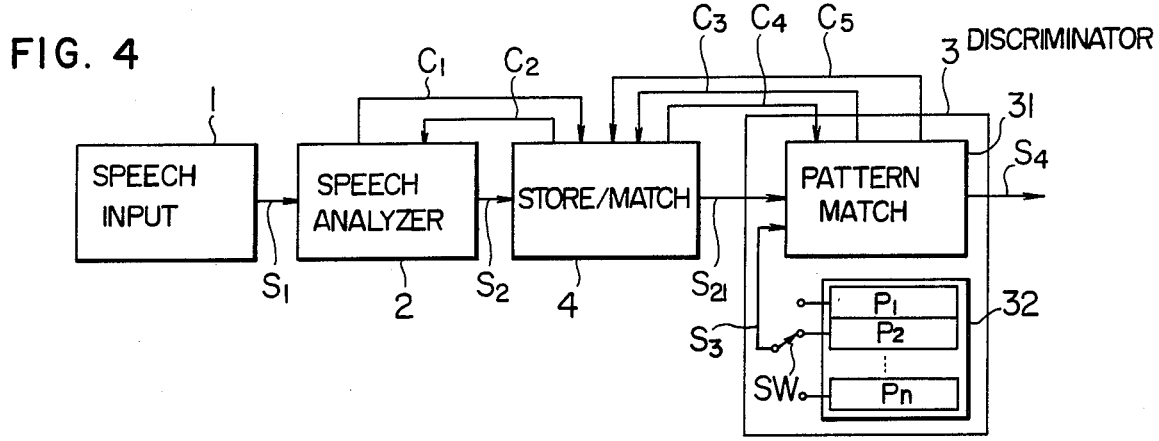
FIG. 4 shows a block diagram of one embodiment of the speech recognition system of the present invention shown in FIG. 1(a).

FIG. 4 shows a block diagram of a first embodiment of the present invention which corresponds to the configuration of FIG. 1(a). In FIG. 4, the store/matching circuit 4 is provided between the analyzer 2 and the discriminator 3. The store/matching circuit 4 stores the analyzed data $S_2$ which is periodically supplied in synchronism with an analyzed data request signal $C_2$, in synchronism with an end of analysis signal $C_1$, and supplied an input data $S_{21}$, together with an input data transfer signal $C_4$ to the discriminator 3 in synchronism with an input data request signal $C_3$. When it is desired to change a position on the time axis of the input data to the discriminator 3, a relative shift quantity from a current processing position is set by address data $C_5$.

In FIG. 4, a speech signal $S_1$ from the speech input device 1 such as a tape recorder is analyzed by the analyzer 2, which produces the analyzed signal $S_2$. For example, the speech signal $S_1$ is sampled at 8 KHz and the samples are analyzed in each frame of 10 milliseconds. The analysis may be a spectrum analysis by band analysis filters or an autocorrelation analysis. In the present embodiment, a logarithmic likelihood ratio the spectrum which is considered most appropriate to recognize the speech is used and the autocorrelation analysis is employed. Eighty speech data sampled at 8 KHz are converted to autocorrelation coefficients $\rho_\tau^{(i)}$ ($\tau=0, 1, 2, \ldots p$) in the analyzer 2, where i is a frame number allocated to each analysis section and $\tau$ is a dimension number of an analyzed parameter which represents the autocorrelation coefficient.

When the most likelihood spectrum data is used as the standard pattern $S_3$, the likelihood between the input pattern defined by a formula (1) below and the standard pattern are checked to determine the degree of match.

$$Li(j) = -\log\left( \sum_{\tau=0}^{p} A_\tau^{(j)} \rho_\tau^{(i)} \right) \quad (1)$$

where $A_\tau^{(j)}$ ($\tau=0, 1, 2, \ldots p$) are most likelihood spectrum data which are preregistered as the standard patterns and derived from linear predictive coefficients. They are calculated for n standard patterns respectively as $P_1, P_2, \ldots P_n$ and registered in a standard pattern memory 32. When the pattern length extends over a plurality of frames, the formula (1) is calculated for each of the frames and the results are added together. When a start point and/or an end point of the input pattern are not known or the input pattern expands or shrinks, a dynamic programming method which is common in a time warping matching system may be used. In this manner, the standard pattern which most closely matches the input pattern, or a code thereof is produced as the recognition signal $S_4$.

As the number of standard patterns ($P_1, P_2, \ldots P_n$) increases, the calculation time increases accordingly, and the data transfer time also increases. The analyzed data received during this time period is stored in a storage of the store/matching circuit 4.

The operations of FIG. 4 for two recognition methods will now be explained.

Figure 5:
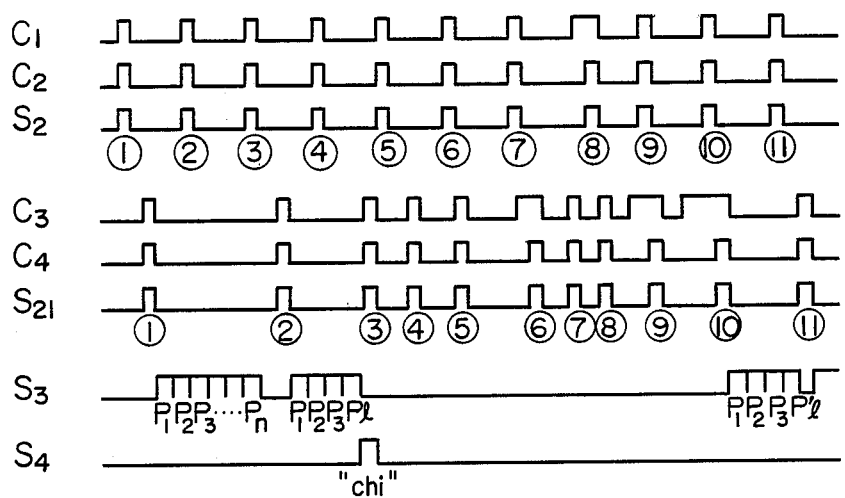
FIG. 5 shows a time chart for major signals when a continuous pattern recognition system is applied to the embodiment of FIG. 4.

A first method is a continuous pattern recognition method for a large number of standard patterns. FIG. 5 shows a time chart therefor. Even in the continuous recognition method for words or phonemes, a silent period always exists between phrases or clauses. It is a basic idea of the present method to recover the delay by the silent period. In the analyzer 2, when the analysis in one frame period is completed, the completion of the analysis is reported to the store/matching circuit 4 by the end of analysis signal $C_1$, and if the store/matching circuit 4 is ready to read in, the analyzed data $S_2$ is read into the store/matching circuit 4 in the order of ①, ②, ③, … ⑪ as shown in FIG. 5 in synchronism with the end of analysis signal $C_1$. On the other hand, independently from the read-in of the analyzed data $S_2$, the discriminator 3 does a discrimination. When the input data request signal $C_3$ is issued from the pattern comparator 31 of the discriminator 3, the store/matching circuit 4 check the readout condition and if the readout condition is met it sends out the analyzed data in the order of ①, ②, ③, … ⑪ to the discriminator 3 as the input data $S_{21}$ thereto in synchronism with the input data transfer signal $C_4$. In the pattern comparator 31 of the discriminator 3, the input data $S_{21}$ is compared with the standard pattern $S_3$ of the standard patterns $P_1, P_2, \ldots P_n$ stored in the register 32, which is selected by a switch SW.

In FIG. 5, it is assumed that phonemes "ichi, ni" (which indicate "one" and "two" in Japanese) are generated with the phoneme "chi" is recognized from the input data ②. If there is a silent period between the phoneme "chi" and the next phoneme "ni", it is not necessary to compare it with the standard patterns. It is an effective way to first determine vocal or silent sound and omit the comparison if the silent sound is present. It is also important in saving processing time and reducing misrecognition to terminate the subsequent comparison when the degree of match with the standard pattern is very high or low in the course of the comparison. In this manner, the lag time for the input data can be recovered. In FIG. 5, the phoneme "chi" is recognized by the standard pattern $P_l$ and the recognition output $S_4$ is produced, and for the data ⑩ of the input data $S_{21}$, the standard pattern $P_l'$ is turned off while the recognition output $S_4$ is off. When the data ④ of the analyzed data $S_2$ is read into the store/matching circuit 4, the data ② of the input data $S_{21}$ is read out. Accordingly, at least the data ③ and ④ are stored in the store/matching circuit 4. When the data ⑨ is read out as the input data $S_{21}$, no data is stored in the store/matching circuit 4. When the data ⑧ is to be read in as the input data $S_2$, it must wait until the data ⑦ is read out, and when the data ⑥ is to be read out as the input data $S_{21}$, it must wait until the data ⑦ is read in as the input data $S_2$. The wait sequence depends on a particular configuration of the store/matching circuit 4 and it is not always necessary, as will be explained in detail later.

Figure 6:
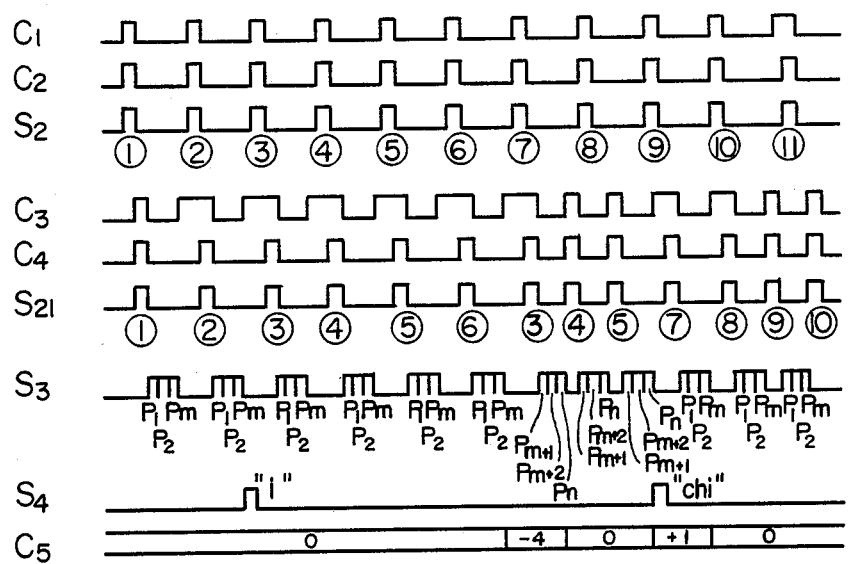
FIG. 6 shows a time chart for major signals when a two-layer hierarchy pattern recognition system is applied to the embodiment of FIG. 4.

A second method is a two-layer hierarchy pattern recognition method. FIG. 6 shows a time chart therefor. A first layer of standard patterns $P_1, P_2, \ldots P_m$ and a second layer of standard patterns $P_{m+1}, P_{m+2}, \ldots P_n$ are used. For example, the vowels are recognized by the first layer and the consonants are recognized by the second layer. By dividing the standard patterns into two layers, the comparison time for the first layer and the second layer are shorter than a total comparison time for all of the phonemes. In addition, since the frequency of the vowel in the speech is high and the number of vowels is approximately one third of the number of consonants, the processing time is materially reduced by the use of the two-layer hierarchy processing system. It is no assumed that the processing time for the first layer is sufficiently shorter than one frame period. In FIG. 6, when the speech "ichi" is generated, the data ② is supplied to the discriminator 3 as the data $S_{21}$ in the first layer processing so that the top phoneme "i" is recognized and the recognition output $S_4$ is produced. Since it is the top phoneme, it is recognized as "i". Then the data ⑥ is supplied to the discriminator 3 as the data $S_{21}$ so that the end phoneme "i" is recognized and the address $C_5$ is decremented from address 0 by four addresses as a result, the second layer processing is started from address "−4" to check the data ③ to detect the constant. The reason for decrementing the address to "−4" is that the register specifying the address of the memory in the store/matching circuit 4 is always in advance by one, and it is not an essential feature of the present invention. The consonant "ch" is detected from the data ⑤ of $S_{21}$ and the phoneme "chi" is recognized. Seven frames of analyzed data ③, ④, ... ⑨ including the data ⑨ read in as the data $S_2$ and the data used in the second layer processing are now stored in the memory. The address data is then incremented by one to "+1" so that the first layer processing starts from the data ⑦. Because the first layer processing is shorter than the frame period, the processing catches up.

In the present embodiment, the memory capacity L of the memory in the store/matching circuit 4 may be as large as seven frames of analyzed data. In general, it is represented as follows.

$$S(0) = 1 \quad (2)$$

$$S(T) = 1 \text{ if } S(T-1) + f(T)/C - 1 < 1 \quad (3)$$

$$S(T) = S(T-1) + f(T)/C - 1 \text{ if } S(T-1) + f(T)/C - 1 \geq 1 \quad (4)$$

where
T is a frame number,
f(T) is the time required for recognition processing when the frame T is processed,
f(T)/C is the number of frames required for recognition processing when the frame T is processed,
S(T) is the number of unprocessed frames when the frame T is processed, and
C is one frame period.

Memory capacity $L \geq \max\{S(T) \times (\text{analyzed data number in a frame})\}$ (5)

The formula (2) represents a case where the recognition processing is completed within one frame period. In this case the data held unprocessed is processed so that the number of unprocessed data stored in the memory of the store/matching circuit 4 decreases.

Figure 7:
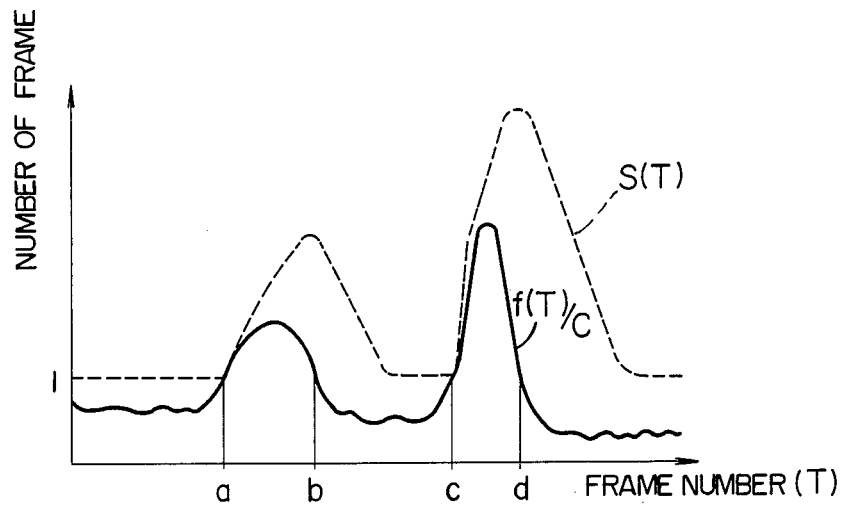
FIG. 7 shows changes, in time, of the number of frames waiting for processing in a store/matching circuit and the number of frames required for recognition processing when the two-layer hierarchy pattern recognition system is applied to the embodiment of FIG. 4.

The formula (3) represents a case where the recognition processing is not completed within one frame period. In this case, the number of unprocessed data stored in the memory increases. Accordingly, the memory capacity L is set to be larger than the maximum of the unprocessed data as represented by the formula (5). FIG. 7 illustrates the relation.

In FIG. 7, in regions of a $<T<b$ and $c<T>d$, the recognition processing does not complete in one frame period and S(T) increases, and in regions of $T \geq b$ and $T \geq d$, the recognition processing completes in one frame period and S(T) decreases and finally it catches up to $S(T) = 1$. It is thus seen that the present invention realizes the real time processing while averaging the variances of the comparison time and realizes the hierarchy processing while absorbing and averaging the variances of access to the input data to be recognized.

A specific circuit configuration of the store/matching circuit 4 is now explained.

Figure 8:
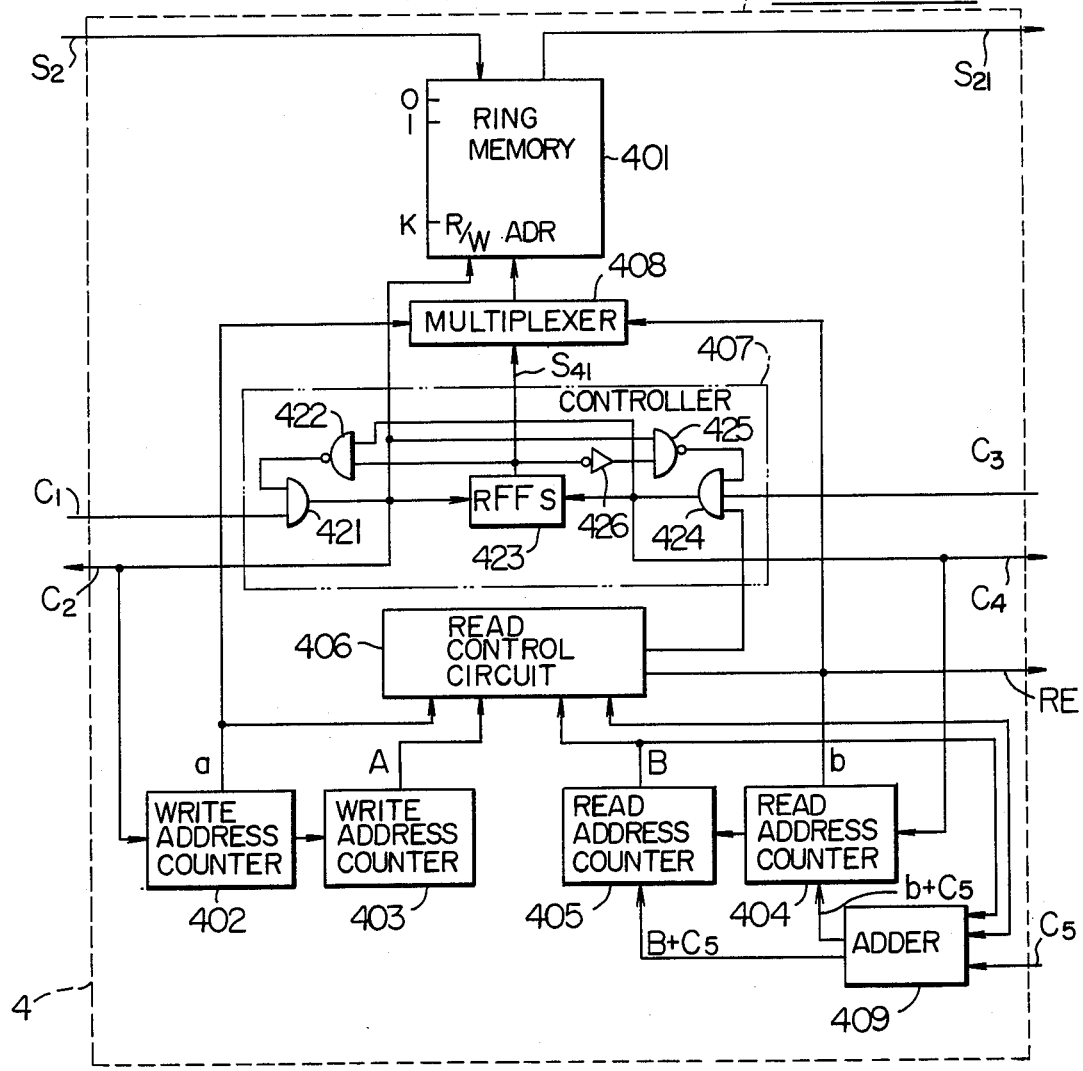
FIG. 8 shows a circuit diagram of the store/matching circuit based on a ring memory system.

FIG. 8 shows a circuit configuration of the store/matching circuit 4 which uses a memory circuit based on a read/write system called a ring memory system. In this system, the memory circuit is circulated to produce continuous states and always stores a predetermined amount of past data. The circuit comprises a (k+1)-word memory 401 (where one word corresponds to one frame of analyzed data), write address counters 402 and 403 which are used when the analyzed data is to be inputted, read address counters 404 and 405 which are used in the read operation, a read control circuit 406 which determines if the readout operation is permitted or not, and a controller 407 which controls the read/write operation. When the end of analysis signal $C_1$ is supplied from the analyzer 2 to the controller 407, a logical AND circuit (AND gate) 421 checks to see if the memory 401 which stores current data is being used for the read operation. The AND gate 421 produces a logical "0" output when a logical NAND circuit (NAND gate) 422 produces a read output so that the end of analysis signal $C_1$ is blocked by the AND gate 421. When the read operation of the memory 401 is terminated, the output of the AND gate 421 resets a flip-flop 423, and changes the read/write signal to "0" to set the write operation. A multiplexer 408 supplies an output of the write address counter 402 to an address terminal ADR of the memory 401 as an address thereto in response to the output of flip-flop 23 on line $S_{41}$. The output of the AND gate 421 is supplied to the memory 401 as a write operation signal so that the analyzed data $S_2$ is written into the specified address of the memory 401. The output of the AND gate 421 functions as the analzyed data request the sending of signal $C_2$ to request the data $S_2$ to the analyzer 2 and increments the write address counter 402 as the data $S_2$ is written into the memory 401 to update the write address a in preparation for the next data write operation. The write address counter 402 is a scale-of-(k+1) or divide by (k+1) counter and an overflow signal thereof increments the scale-of-Ao or divide by Ao counter 403. Thus, the counter 402 sequentially produces outputs of a=0, 1, 2, ..., k, 0, 1, ..., and the counter 403 sequentially produces outputs of A=0, 1, ... Ao, 0, .... The read request signal $C_3$ sent from the discriminator 3 changes to logical "1" and it is logically ANDed with a signal from a NAND gate 425 which indicates whether the write operation is being carried out ("0") or not ("1") and a signal from the read control circuit 406 which indicates whether the read operation is permitted ("1") or not ("0"). If the write operation is not being carried out and the read operation is permitted, the output of the AND gate 424 assumes "1" to set the flip-flop 423. As a result, the read/write signal $S_{41}$ designates the read operation and the output of the read address counter 404 is supplied to the address terminal ADR of the memory 401 through the multiplexer 408. The output of the AND gate 424 functions as the input data transfer signal $C_4$ which is supplied to the discriminator 3 together with the data $S_{21}$ from the memory 401. As the data is supplied, the read address counter 404 is incremented at the end of the input data transfer signal $C_4$ to update the address b in preparation for the next data read operation. Like the write address counter 402, the read address counter 404 is a scale-of-(k+1) counter and an overflow signal thereof increments a scale-of-Bo counter 405. Thus, the counter 404 sequentially produces outputs of b=0, 1, 2, ..., k, 0, 1, ..., and the counter 405 sequentially produces outputs of B=0, 1, .., Bo, 0, 1, .... The output of the flip-flop 423 represents the write mode when it is "0" and the read mode when it is "1", and the NAND gate 422 produces the "0" output in the read mode and when the AND gate 424 supplies the read signal. The output of the flip-flop 423 is supplied to an AND gate 425 through a NOT circuit 426 to determine the write status. The AND gate 425 produces a "0" output when the output of the flip-flop 423 is "0" (write mode) and the output of the AND gate 421 is "1" (read operation). The flip-flop 423 meets the following truth table, and when inputs are simultaneously applied it does not change the status but retains the previous status.

TABLE 1

| Input | | Output |
|---|---|---|
| Set (Read Signal) | Reset (Write Signal) | |
| 0 | 0 | No change |
| 0 | 1 | 0 (Write Mode) |
| 1 | 0 | 1 (Read Mode) |
| 1 | 1 | No change |

Figure 9:
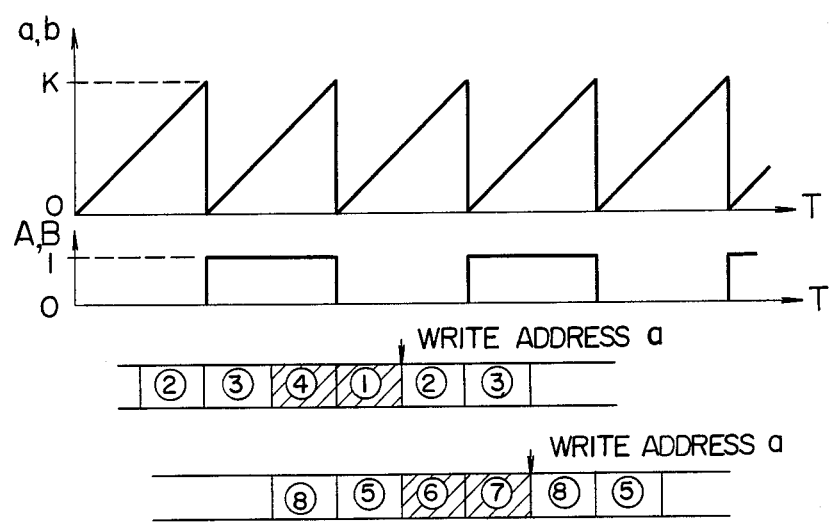
FIG. 9 shows a time chart of outputs of counters, 402, 403, 404 and 405 shown in FIG. 8 in which the counters 403 and 405 are binary counters, and a status output of a readout control circuit.

The address data $C_5$ supplied from the discriminator 3 is used to change the read position and it represents a relative address to a current address. It is summed with the outputs b and B of the read address counters 404 and 405 by an adder 409 to produce sums ($b+C_5$) and ($B+C_5$), respectively, which are used to update the read address counters 404 and 405, respectively. The address data $C_5$ is in a range of $-k<C_5<k$, where a negative value indicates the retroaction. The read address counters 404 and 405 and the write address counters 402 and 403 may be started from any counts but both start counts must be equal. In the simplest case, they may be initially reset to "0". The read control circuit 406 determines whether the read operation is permitted or not, as described above and it may be constructed by a known logic circuit which meets the following truth table shown in Table 2. FIG. 9 shows changes of status on a time axis.

TABLE 2

| Input | | Condition for a,b | Output | Status Number |
|---|---|---|---|---|
| A | B | | | |
| 0 | 0 | a > b | 1 | ① |
| | | a ≦ b | 0 | ② |
| 0 | 1 | a > b | 0 | ③ |
| | | a ≦ b | 1 | ④ |
| 1 | 0 | a > b | 0 | ⑤ |
| | | a ≦ b | 1 | ⑥ |
| 1 | 1 | a > b | 1 | ⑦ |
| | | a ≦ b | 0 | ⑧ |

In Table 2, the "1" output indicates "read permitted" and the "0" output indicates "read not permitted".

Both the write address counter 403 and the read address counter 405 shown in FIG. 8 are binary counters in the present example and the outputs A and B thereof assume "0" or "1" as shown in FIG. 9.

In FIG. 9, hatched areas of the blocks indicated by the status numbers ①-⑧ are "read permitted" areas from which the past k words (or frames) from the write address can be retroactively read out.

Figure 10:
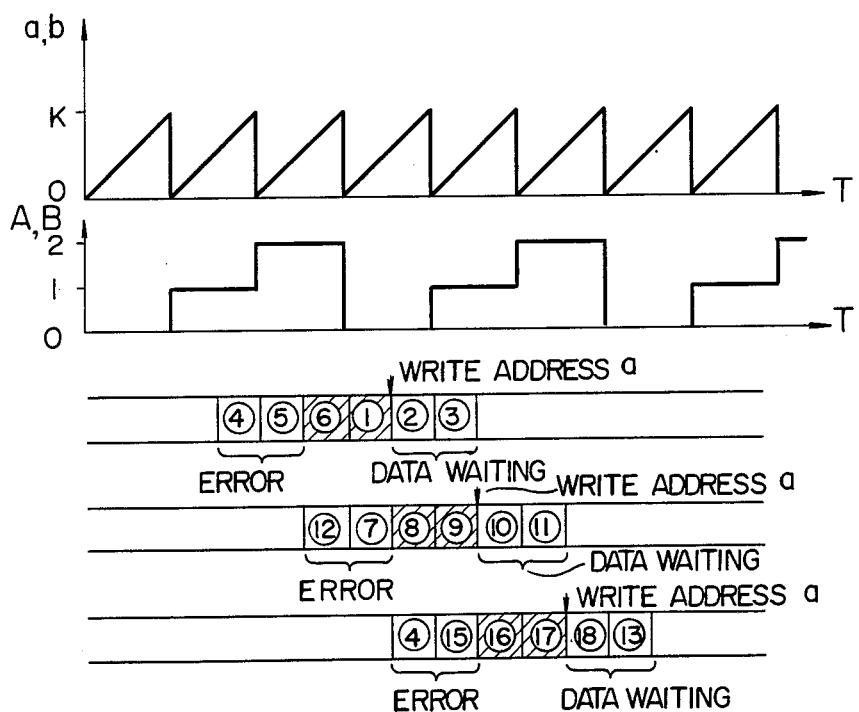
FIG. 10 shows a time chart of outputs of the counters 402, 403, 404 and 405 shown in FIG. 8 in which the counters 403 and 405 are ternary counters and the status output of the readout control circuit.

In the truth table of Table 2, however, if the "read not permitted" is indicated, it is not clear whether the circuit has tried to prematurely read unwritten data or whether it has tried to read out more past data than k words. An error detection for the wrong readout of the past vacant data can be simply attained in the following manner. An example thereof is shown in a truth table of Table 3 and the changes of status on a time axis is shown in FIG. 10.

TABLE 3

| Input | | Condition for a, b | Output | Status Number |
|---|---|---|---|---|
| A | B | | | |
| 0 | 0 | a > b | 1 | ① |
| | | a ≦ b | 0 | ② |
| 0 | 1 | a > b | 0 | ③ |
| | | a ≦ b | x | ④ |
| 0 | 2 | a > b | x | ⑤ |
| | | a ≦ b | 1 | ⑥ |
| 1 | 0 | a > b | x | ⑦ |
| | | a ≦ b | 1 | ⑧ |
| 1 | 1 | a > b | 1 | ⑨ |
| | | a ≦ b | 0 | ⑩ |
| 1 | 2 | a > b | 0 | ⑪ |
| | | a ≦ b | x | ⑫ |
| 2 | 0 | a > b | 0 | ⑬ |
| | | a ≦ b | x | ⑭ |
| 2 | 1 | a > b | x | ⑮ |
| | | a ≦ b | 1 | ⑯ |
| 2 | 2 | a > b | 1 | ⑰ |
| | | a ≦ b | 0 | ⑱ |

The write address counter 403 and the read address counter 405 shown in FIG. 8 are ternary counters in the present example. As shown in FIG. 10, hatched "read permitted" areas ((①), (⑥), etc.), error areas ((④), (⑤), etc.) and wait data areas ((②), (③), etc.) because of premature read operation can be discriminated. In Table 3, the "1" output indicates "read permitted", the "0" output indicates "read not permitted" and the "x" output indicates "read error", which represents a case where the circuit has tried to read out data prior to the data being stored in the memory. When the "x" output is produced, a read error signal RE in FIG. 8 assumes "1", which drives a display device (not shown) to enable the detection of the error condition. The truth tables of Tables 2 and 3 can be implemented by a read-only memory (ROM) or a sequential logic circuit.

In the illustrated examples, a status other than those indicated by the status numbers shown in FIGS. 9 and 10 can be assumed, but a range of addresses which can be changed by the address data $C_5$ for such a virtual "read permitted" range is $-k < C_5 < k$ (where the capacity of the memory 401 is $k+1$) and hence a range movable from the "read permitted" range 0 to $-k$ is $-2k$ to $+k$ at most. These are all included in the status numbers shown in FIGS. 9 and 10. If the range is to be changed several times, the circuit may be designed to prevent the updating when the content of the read address counter is not in the "read permitted" range.

In FIG. 8, if the repeated frequency of the end of analysis signal $C_1$ is constant, for example, 8 kHz and the input data can be stored in the ring memory 401 in one cycle, the data request signal $C_2$ may be omitted. In this case, a latch and a second flip-flop FF2 are additionally provided so that the input data $S_2$ is set into the latch by the end of analysis signal $C_1$ and then it is supplied to the ring memory 401 and the flip-flop FF2 is set by the end of analysis signal $C_1$ and the output signal of the flip-flop FF2 is applied to the AND gate 421 shown in FIG. 8 to reset the flip-flop FF2 by the output signal of the AND gate 421.

Figure 11:
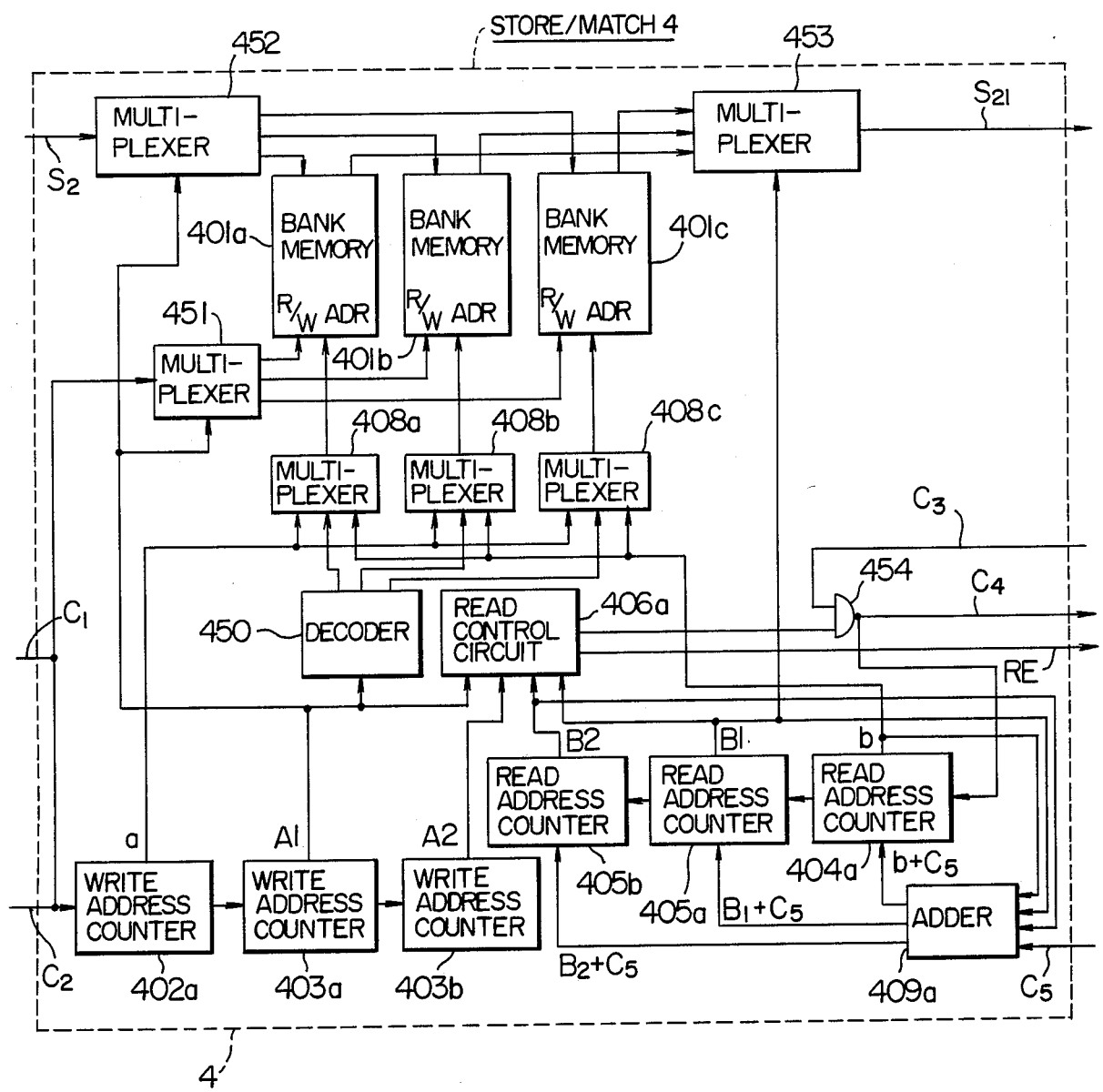
FIG. 11 shows a circuit diagram of a store/matching circuit based on a bank memory system.

The ring memory system has so far been described. A bank memory system will now be described. In the ring memory system, the read and write operations are controlled such that one memory is time-shared by the read and write operations, while in the bank memory system a plurality of memories (each referred to as a bank memory) are provided to allow simultaneous read and write operations. In the bank memory system, the control is simpler but more memory capacity is needed. A specific circuit configuration of the store/matching circuit 4 in the bank memory system is shown in FIG. 11. N (N being an integer larger than one, and N being 3 in the example of FIG. 11) independent bank memories 401a, 401b and 401c each having a memory capacity of $(k'+1)$ words are provided. They are accessed in the order of the bank 401a (address=0, 1, ..., k'), the bank 401b (address=0, 1, ..., k'), the bank 401c (address=0, 1, ..., k'), the bank 401a (address=0, 1, ..., k'). When one bank is being updated, another bank can be read out. Write address counters 402a, 403a and 403b are a scale-of $(k'+1)$ counter, a scale-of-N counter and a binary counter, respectively, and read address counter 404a, 405a and 405b are similar counters and overflow signals therefrom increment the succeeding stages. The outputs A1 and B1 of the counters 403a and 405a are used as bank selection signals. The output A1 is decoded by a decoder 450 which selects one of multiplexers 408a, 408b and 408c, which in turn supplies the output a of the write address counter 402a to the corresponding bank memory as an address thereto. The output b of the read address counter 404a is supplied to other bank memories as the addresses thereto. When the end of analysis signal $C_1$ is supplied from the analyzer 2, it is sent back to the analyzer 2 as the data request signal $C_2$ so that the analyzed data $S_2$ sent from the analyzer 2 is written into one of the bank memories through the multiplexer 452. The bank memory is selected by the output A1 of the write address counter 403a as described above, and the end of analysis signal $C_1$ is used as the write signal to the bank memory selected by the multiplexer 451. The write address in the bank memory is determined by the output a of the write address counter 402a. When the write operation is completed, the write address counters 402a, 403a and 403b are incremented at the end of the analyzed data request signal $C_2$ in preparation for the next address. On the other hand, the read operation is carried out independently of the write operation. As the read request signal $C_3$ is supplied from the discriminator 3, it is gated through the AND gate 454 as the data transfer signal $C_4$ to the discriminator 3 when the output of the read control circuit 406a is "1" indicating "read permitted". On the other hand, the data is read out by supplying the output b of the read address counter 404a to the bank memory which is not engaged in the write operation through the multiplexer 408a, 408b or 408c and selecting the output of the selected bank memory which is at the multiplexer 453 by the output B1 of the read address counter 405a. It is supplied to the discriminator 3 as the input data $S_{21}$. If the read bank and the write bank are the same, the read control circuit 406a determines the "read not permitted" condition and the data transfer signal $C_4$ is blocked by the AND gate 454. When the read control circuit 406a determines the "read permitted" condition, the output thereof causes the AND gate 454 to open so that the data request signal $C_3$ is sent to the discriminator 3 as the data transfer signal $C_4$. When the read data has been transferred, the read address counters 404a, 405a and 405b are incremented at the end of the data transfer signal $C_4$. On the other hand, the outputs b, B1 and B2 of those counters are summed with the address data $C_5$ in the adder 409a to produce sums $(b+C_5)$, $(B1+C_5)$ and $(B2+C_5)$, respectively, which are used to update the read address counters 404a, 405a and 405b, respectively. The allowable range of the address data $C_5$ is $(N-1)\times k' \pm (N-1)\times k'$. In the example of FIG. 11, N is equal to 3 and the allowable variation is $\pm 2k'$.

The read control circuit 406a is basically identical to that of FIG. 8. The counters 403b and 405b are provided when the error detection is desired. When the counters 403b and 405b are binary counters and the counters 403a and 405a are ternary counters, the input and the output of the read control circuit 406a follow a truth table shown in Table 4.

TABLE 4

| Input | | | | Output | Status Number |
|---|---|---|---|---|---|
| A2 | B2 | A1 | B1 | | |
| 0 | 0 | 0 | 0 | 0 | ① |
| | | | 1 | 0 | ② |
| | | | 2 | x | ③ |
| | | 1 | 0 | 1 | ④ |
| | | | 1 | 0 | ⑤ |
| | | | 2 | 0 | ⑥ |
| | | 2 | 0 | 1 | ⑦ |
| | | | 1 | 1 | ⑧ |
| | | | 2 | 0 | ⑨ |

TABLE 4-continued

| Input | | | | Output | Status Number |
|---|---|---|---|---|---|
| A2 | B2 | A1 | B1 | | |
| 0 | 1 | 0 | 0 | x | ⑩ |
|   |   |   | 1 | 1 | ⑪ |
|   |   |   | 2 | 1 | ⑫ |
|   |   | 1 | 0 | x | ⑬ |
|   |   |   | 1 | x | ⑭ |
|   |   |   | 2 | 1 | ⑮ |
|   |   | 2 | 0 | 0 | ⑯ |
|   |   |   | 1 | x | ⑰ |
|   |   |   | 2 | x | ⑱ |
| 1 | 0 | 0 | 0 | x | ⑲ |
|   |   |   | 1 | 1 | ⑳ |
|   |   |   | 2 | 1 | ㉑ |
| 1 | 0 | 1 | 0 | x | ㉒ |
|   |   |   | 1 | x | ㉓ |
|   |   |   | 2 | 1 | ㉔ |
|   |   | 2 | 0 | 0 | ㉕ |
|   |   |   | 1 | x | ㉖ |
|   |   |   | 2 | x | ㉗ |
| 1 | 1 | 0 | 0 | 0 | ㉘ |
|   |   |   | 1 | 0 | ㉙ |
|   |   |   | 2 | x | ㉚ |
|   |   | 1 | 0 | 1 | ㉛ |
|   |   |   | 1 | 0 | ㉜ |
|   |   |   | 2 | 0 | ㉝ |
|   |   | 2 | 0 | 1 | ㉞ |
|   |   |   | 1 | 1 | ㉟ |
|   |   |   | 2 | x | ㊱ |

In Table 4, the "1" output indicates "read permitted", the "0" output indicates "read not permitted", and the "x" output indicates "read error", which represents a case where the circuit tried to read out the data prior to the stored data. Like in the case of FIG. 8, when the "x" output is produced, the read error signal RE assumes "1". The relation of those signal states is shown in FIG. 12.

Figure 12:
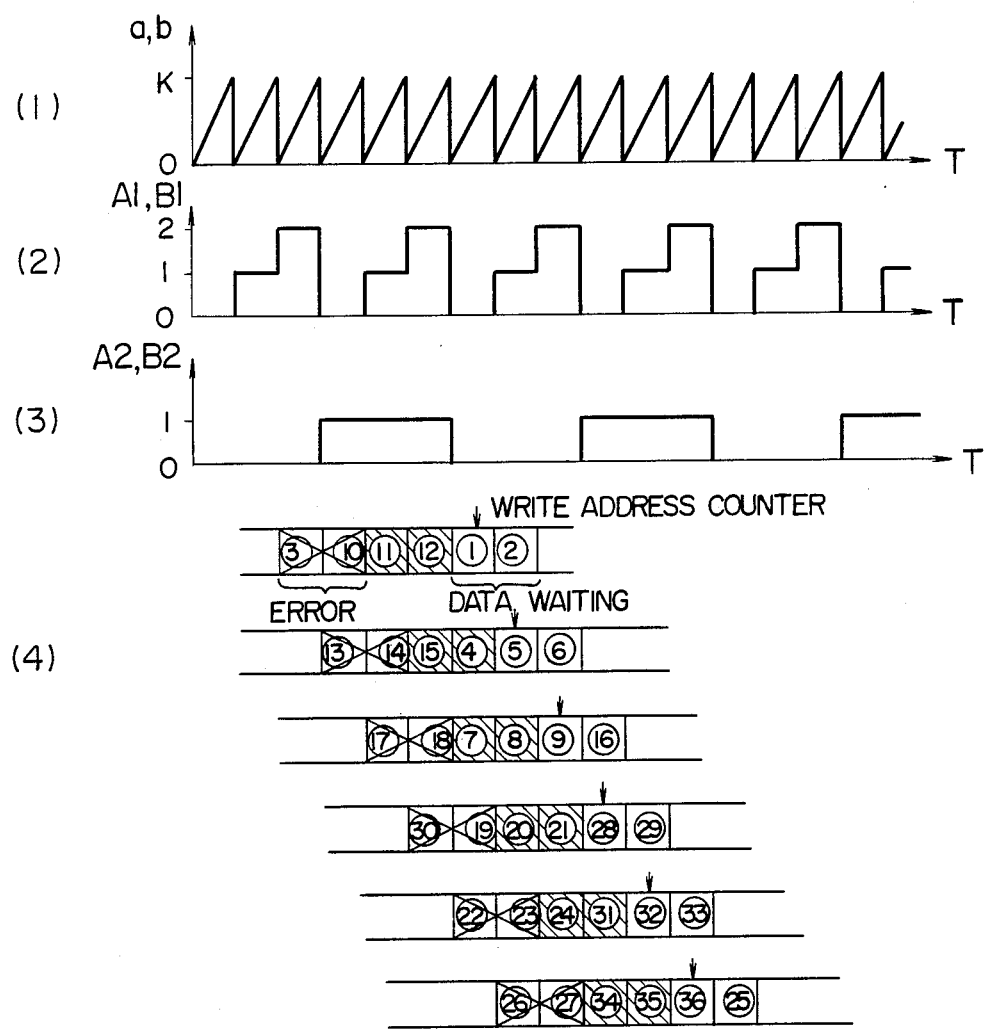
FIG. 12 shows a time chart of outputs of counters 402a, 403a, 404a, 405a, 403b and 405b shown in FIG. 11 and a status output of a readout control circuit.

FIG. 12(1) shows the change in time of the outputs of the counters 402a and 402b shown in FIG. 11, FIG. 12(2) shows the change in time of the outputs of the counters 403a and 405b, and FIG. 12(3) shows the change in time of the outputs of the counters 403b and 405b. FIG. 12(4) shows a time relation between the status shown by the status members ①- ㊱ of Table 4 and the outputs of the counters. Hatched areas show "read permitted" areas, areas ①, ②, ⑤, ⑥, . . . show data wait areas, and areas x show read error areas. The reason for selecting the number N of banks to 3 is that when the two-bank system which is a minimum requirement is used the data extending across the banks cannot be accessed in the hierarchy processing system. As the number N is further increased, the memory can be more efficiently used and the accessable memory capacity increases for a given memory capacity. The need for the error detection depends on the particular system, and the read control circuit is not always necessary in a circumstance where the data can always be read out.

In the embodiments shown in FIGS. 8 and 11, when the data stored in the memory is retroactively read out by a desired number of sampling points, the data at each sampling point is sequentially read out in the order of store. Alternatively, the data may be read out in a reverse order to the order of store or the data at every certain number of sampling points may be read out. In this case, a mode signal is defined in accordance with the combination of the order of readout and the sampling points and the read address counters are controlled to count up or down, or increment or decrement the counts in accordance with the mode signal.

As described hereinabove, according to the present invention, the real time speech recognition is attained for a large number of standard patterns or the hierarchy recognition system is used.

We claim:

1. A speech recognition system comprising:
    (a) first means for inputting speech signals;
    (b) analyzer means connected to said first means for analyzing the inputted speech signals to produce analysis data;
    (c) speech discriminator means connected to receive said analysis data for comparing said analysis data with standard patterns of speech so as to recognize the input speech signals; and
    (d) second means for receiving and storing the analysis data from said analyzer means and for supplying the stored analysis data to said speech discriminator means, including write-addressing means for generating write address signals and read-addressing means for generating read address signals, and memory means for storing said analysis data from said analyzer means sequentially under control of said write-addressing means and for reading out said analysis data to said speech discriminator means in a predetermined sequence under control of said read-addressing means in parallel with the storing of said analysis data and independently of the operation of said write-addressing means.

2. A speech recognition system according to claim 1, further comprising a plurality of said speech discriminator means connected in parallel to receiver analysis data supplied by said analyzer means via said second means, and comparator means for comparing output standard patterns read out of said plurality of discriminator means to determine the most appropriate standard pattern.

3. A speech recognition system according to claim 1, wherein said second means further comprises controller means responsive to a write request signal from said analyzer means, requesting that analysis data be written into said memory means, for controlling said write-addressing means to generate a write address, and responsive to a read request signal from said speech discriminator means, requesting that analysis data be read from said memory means, for controlling said read-addressing means to generate a read address, thereby controlling read and write operations of said memory means independently of one another.

4. A speech recognition system according to claim 1, said second means further comprising comparator means for comparing a write address provided by said write-addressing means with a read address provided by said read-addressing means, and for generating a read error signal if the comparison by said comparator means shows that said read address is larger than said write address.

5. A speech recognition system according to claim 1, said second means further comprising means for decreasing or increasing said read address provided by said read-addressing means in response to a value signal received from said discriminator means, so that said read-addressing means can provide said read address lower than said write address without change of said write address in response to said value signal when said discriminator means requests previously stored speech signal information; and means for controlling said read-addressing means and said write-addressing means, respectively, to decrease said read and write addresses by an amount of the capacity of said memory means to point to the first address of said memory means in a ring-like manner when said read and write addresses point to an address beyond the last address of said memory means.

6. A speech recognition system according to claim 1 further comprising an additional second means connected to said first-mentioned second means and including additional write-addressing means and additional read-addressing means, and an additional speech discriminator means for comparing said analysis data with standard patterns, said additional second means and additional speech discriminator means working in a manner similar to said first-mentioned second means and speech discriminator means, wherein said write-addressing and read-addressing means of said first mentioned second means provide to said memory means addresses coarser than addresses of said additional write-addressing and read-addressing means to execute processes of first and second steps.

7. A speech recognition system according to claim 6, wherein said first-mentioned second means and speech discriminator means operate to recognize vowels at a first step of operation and said additional second means and additional speech discriminator means operate to recognize consonants included in the speech signal information in a second step of operation.

8. A speech recognition system comprising:
(a) analyzer means for periodically sampling speech signals to produce speech data;
(b) memory means for storing said speech data sequentially in respective addressable storage locations in the order of the address number of said storage locations;
(c) write-address generating generating means responsive to a write-request signal from said analyzer means for providing a write address for said memory means;
(d) speech discriminator means for comparing said speech data stored in said memory means with standard speech patterns so as to recognize the input speech signals;
(e) read-address generating means responsive to a read-request signal from said speech discriminator means for providing a read address for said memory means; and
(f) controller means responsive to a signal from said speech discriminator means for controlling said read-address generating means to effect decreasing or increasing of said read address independently of the operation of said write-address generating means.

9. A speech recognition system according to claim 8, further including comparator means for comparing said read address with said write address and for providing a read error signal if the comparison by said comparator means shows that said read address is larger than said write address.

10. A speech recognition system according to claim 9, wherein said controller means comprises a flip-flop connected to said comparator means for storing a flag to permit said read operation when said write operation is not executed and when said comparison by said comparator means shows that said read address is not larger than said write address.

11. A speech recognition system according to claim 8, wherein said controller is means responsive to said write-request and read-request signals for controlling read and write operations of said memory means, and further including multiplexer means responsive to said controller means for providing either one of said read or write address to said memory means, wherein said write address and said write operation are not affected by said read operation.

* * * * *